United States Patent [19]
Breitbach et al.

[11] Patent Number: 5,141,643
[45] Date of Patent: Aug. 25, 1992

[54] FILTER MATERIAL FORMED BY FIBRIDE PARTICLES

[75] Inventors: Peter P. Breitbach, Bretzenheim; Gerd Ritter, Guldental, both of Fed. Rep. of Germany

[73] Assignee: Sietz-Filter-Werke Geo & Theo Seitz/GmbH & Co., Bad Kreuznach, Fed. Rep. of Germany

[21] Appl. No.: 666,526

[22] Filed: Mar. 7, 1991

[30] Foreign Application Priority Data

Mar. 10, 1990 [DE] Fed. Rep. of Germany ....... 4007693

[51] Int. Cl.⁵ ............................................. B01D 24/00
[52] U.S. Cl. .................................... 210/503; 210/504; 210/505; 210/506; 210/508
[58] Field of Search ..................... 210/502.1, 503, 504, 210/505, 506, 507, 508

[56] References Cited

U.S. PATENT DOCUMENTS

| | | | |
|---|---|---|---|
| 3,888,766 | 6/1975 | De Young | 210/680 |
| 4,460,642 | 7/1984 | Errede et al. | 428/283 |
| 4,678,571 | 7/1987 | Hosaka et al. | 210/504 |
| 4,859,340 | 8/1989 | Hou et al. | 210/502.1 |

FOREIGN PATENT DOCUMENTS

| | | |
|---|---|---|
| 145849 | 6/1985 | European Pat. Off. |
| 265762 | 5/1988 | European Pat. Off. |
| 2318831 | 10/1973 | Fed. Rep. of Germany |
| 2813356 | 10/1978 | Fed. Rep. of Germany |
| 3329385 | 2/1985 | Fed. Rep. of Germany |
| 8713306 | 11/1987 | Fed. Rep. of Germany |
| 2016943 | 9/1979 | United Kingdom |
| 2059797 | 4/1981 | United Kingdom |
| 2230278 | 10/1990 | United Kingdom |

OTHER PUBLICATIONS

Credali, Lino: Ferlosa synthetic fibrids, new possibilities for the paper industry. In: TAPPI, International Symposium on synthetic pulps and papers, 1980 pp. 5-16.

Primary Examiner—Robert A. Dawson
Assistant Examiner—David Reifsnyder
Attorney, Agent, or Firm—H. Gibner Lehmann; K. Gibner Lehmann

[57] ABSTRACT

In a filter bed (11) for the solid/fluid separation of media which contain substances that attack or dissolve cellulose, for example cellulase-containing enzymes, a matrix comprising a fibrous material structure of polyolefin fibrid particles (12) which are matted and anchored in one another and which can additionally contain up to 20% by weight of narrower fibrid polyolefin fibres and/or polyolefin fibres that have a fibre length of up to 5 mm. and have just started to fibrillate, in order to strengthen the sheet formation of the matrix. The actual filter-active particles, in particular kieselguhr particles and/or perlite particles having grain sizes of 5 to 100 um., are embedded in the cellulose-free fiber matrix.

6 Claims, 2 Drawing Sheets

FILTER MATERIAL FORMED BY FIBRIDE PARTICLES

CROSS REFERENCES TO RELATED APPLICATIONS

The present application claims priority under 35 USC 119, of Federal Republic of Germany Application No. P 40 07 693.8 filed Mar. 10, 1990.

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

Field of the Invention

This invention relates to a filter bed in the form of a voluminous pulp sheet which is suitable for the solid/fluid separation of media, such as cellulase enzyme, comprising components which dissolve cellulose and/or react chemically therewith, the voluminous pulp sheet comprising a fibre structure in which filter-active particles, in particular Kieselguhr particles and/or perlite particles are embedded as auxiliary filtering agents.

The invention further relates to a process for producing filter beds of this type.

DESCRIPTION OF THE RELATED ART INCLUDING INFORMATION DISCLOSED UNDER 37 CFR §§1.97–1.99

Filter beds which are to be used for fluid/solid separation generally consist of a cellulose fibre matrix in which cellulose fibres are arranged in logical disorder and impart a high degree of strength to the filter pulp sheets both in the dry and in the thoroughly moistened state. Auxiliary filtering agents are embedded in this cellulose fibre matrix in order to meet demanding filtration requirements. These are usually kieselguhrs, perlite, activated carbon or also PVPP. It is also known from DE-OS 33 29 385 to add polyolefin fibres as longer fibre sheet-forming substances to filter beds of this type.

Kieselguhr is defined as loose or porous diatomite, diatomite being a light friable silaceous material resembling chalk that is derived chiefly from the remains of diatoms and is used as a filter aid, adsorbent, filler and abrasive.

It is further known from DE-GM 87 13 306.7 to add to a filtering agent which is to be used for precoated-type filtration, short fibre particles formed from ground cellulose as well as kieselguhr particles in addition to fibrillated polyolefin fibres as filter-active components.

These known filter beds and filtering agents, however, cannot be used for the filtration treatment of media, in particular fluids, which contain components, for example cellulase enzymes, which dissolve cellulose or react chemically therewith.

SUMMARY OF THE INVENTION

It is therefore the object of the invention to make available special filter beds in the case of which the non-resistant native cellulose fibres are replaced by resistant fibres, wherein the mechanical and physical properties of the known filter beds are to be maintained to their full extent.

In accordance with the invention this object is achieved in that the fibrous material structure of the filter bed which is constructed in the manner of a mat is formed completely by polyolefin fibrid particles which are matted with one another and anchored in one another, wherein these fibrid particles are present in a mixture of fibre particles of differing degrees of fibrillation, namely from fibre particles which have only started to fibrillate to completely separated fibrils.

Within the scope of the invention it has unexpectedly been established that the fibrous material structure of polyolefin fibrid particles which are matted with one another and anchored in one another offers sufficient inherent stability for a voluminous pulp sheet and at the same time sufficient strength for absorbing filter-active particles. Maximum advantage is made of the filtration action of the actual auxiliary filtering agents, such as kieselguhr and perlite, embedded in the polyolefin fibrous material structure such that products, for example cellulase products, which dissolve or attack cellulose, may not only be filtered in a refined but also in a sterile manner with filter beds according to the invention.

In preferred embodiments of the invention the fibrous material structure may be formed from fibrid particles of polyethylene or polypropylene or from a mixture of fibrid particles of polyethylene and polypropylene.

With respect to their composition or mixture and distribution according to size, the filter-active particles embedded in the fibrous material structure may be selected and used in filter beds identical to those containing cellulose fibres.

The proportion by weight of polyolefin fibrid particles with respect to the total weight of the filter bed may be between 40% and 60%. The fibre length of the polyolefin fibrid particles may be up to approximately 0.8 to approximately 1.2 mm. In this connection, the fibre length of the completely fibrillated sections, i.e. the fibrils, is generally only a fraction of the fibre length of the fibre particles which have started to fibrillate.

Provided that the filtration requirement can be met in each case, up to 20% of the weight of the fibrous material structure may consist of longer polyolefin fibres or polyolefin fibres which have started to fibrillate and have a fibre length of up to 5 mm.

Within the scope of the invention there is proposed for the production of filter beds of this type a process in the case of which the polyolefin fibrid mass is violently and turbulently mixed with process water and an auxiliary filtering agent is added to this turbulent mixture in an amount corresponding to the final ratio of the amounts with respect to the polyolefin fibrid mass. Furthermore, in the case of this process the suspension formed in this way, optionally after being diluted with additional process water, is poured in a layer onto a sieve belt and is converted into a mat by the removal of the process water, this mat being dried in a continuous flow dryer at a temperature which is at least 10° C. below the melting temperature of the polyolefin fibrids in each case, and is transformed by formatting into the filter beds ready for use. This process is notable in that even at the beginning of the process the polyolefin fibrid particles are turbulently mixed with the process water and the ramified structure thereof is thus fully developed. The auxiliary filtering agent is added to the polyolefin fibrid particles pre-treated in this manner with the process water whilst they continue to be maintained in a turbulent state. This produces a suspension in which the polyolefin fibrid particles are activated to a great extent for the subsequent anchoring in one another. When the mat is formed on a sieve belt and the mat is dried, this activation is used in order that the fibrid particles are deposited together and are anchored in one another, any agglomeration of the fibrid particles having to be avoided.

The activation of the fibrid particles as well as the effective anchoring and embedding in one another can further be essentially improved in the process according to the invention in that the initial amount of process water is selected in relation to the amount of polyolefin fibrid mass and auxiliary filtering agent in such a way that during the turbulence treatment a suspension of 4% absolutely dry (=40 g/l) results which is diluted to 2% absolutely dry (=20 g/l) before it is poured out.

A further improvement of the anchoring and embedding together of the fibrid particles can be achieved in that the process water is removed by flowing downwards under the effect of gravity at the beginning of the sieve belt and then under the effect of a vacuum. Finally, in order to ensure that the fibrid particles are effectively anchored and that the filter bed has a high degree of porosity, it is recommended that the mat be dried with warm air.

If it is intended to reinforce the fibrous material structure with up to 20% of its weight with longer fibre polyolefin fibres and/or polyolefin fibres which have started to fibrillate and have a fibre length of up to 5 mm., it is advisable, within the scope of the process according to the invention, to add these longer fibre polyolefin fibres and polyolefin fibres which have started to fibrillate first of all to the mixture of process water and polyolefin fibrid mass which is in a turbulent state and then to feed the auxiliary filtering agents to the mixture which is still in a turbulent state.

Other features and advantages will hereinafter appear.

BRIEF DESCRIPTION OF THE DRAWINGS

In the following, one embodiment of the invention will be described in further detail with reference to the drawing, wherein.

DESCRIPTION OF THE PREFERRED EMBODIMENT

Figure 1:
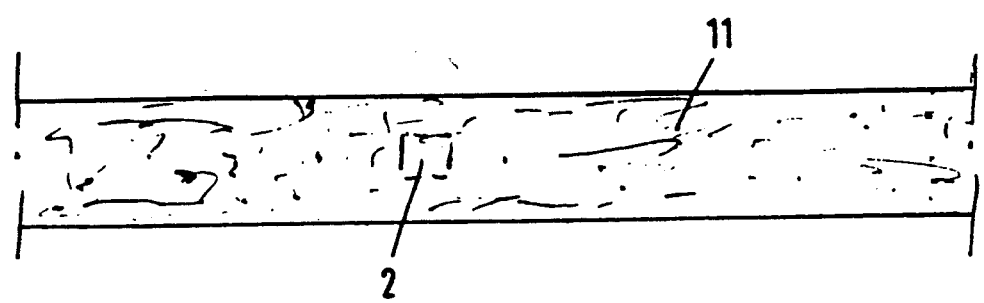
FIG. 1 shows in section a filter bed according to the invention.

The filter bed 11 illustrated in FIG. 1 is a voluminous special pulp sheet of approximately 1200 to 1500 g/m$^2$ with a thickness of 2.8 to 4.5 mm. and a density of up to 0.5 g/cm.$^3$.

Figure 3:
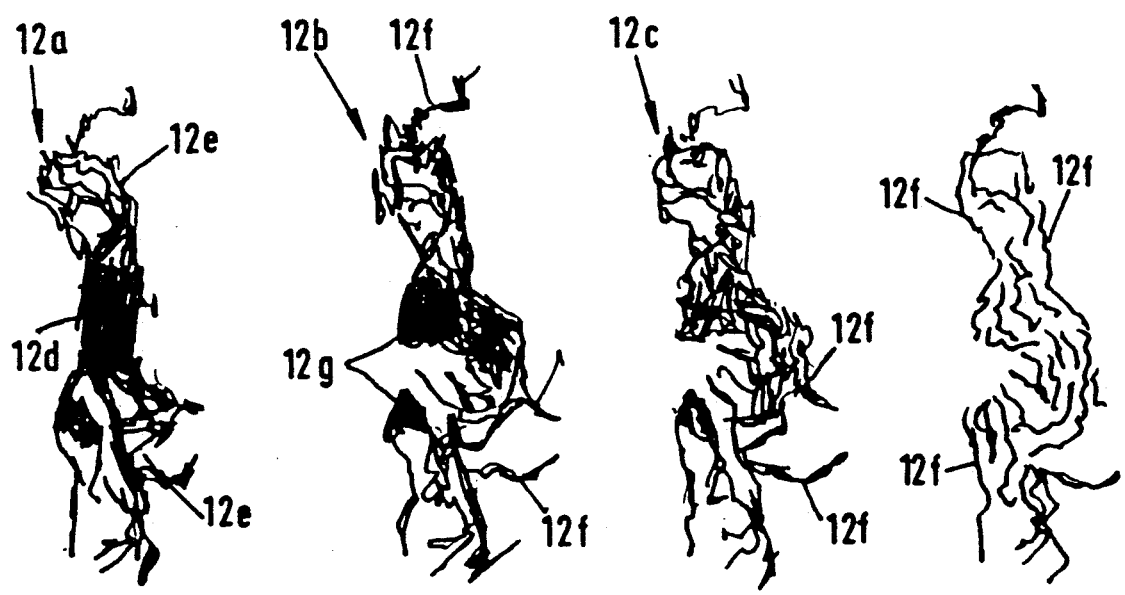
FIG. 3 shows polyolefin fibrid particles of differing degrees of fibrillation enlarged approximately 250 times.
Figure 2:
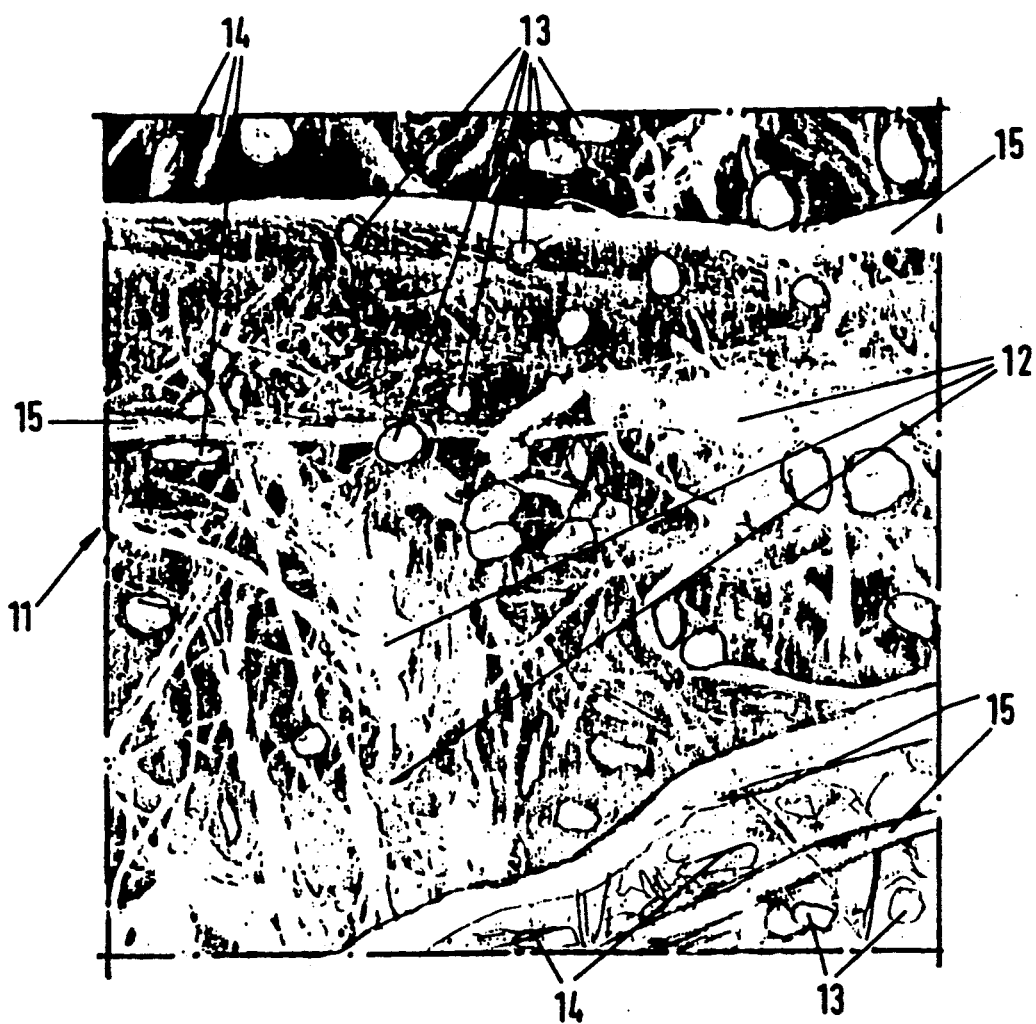
FIG. 2 shows a section II of FIG. 1 enlarged approximately 1000 times.

As FIG. 2 shows, the filter bed 11 comprises a fibre matrix of a fibrous material structure for the absorption of the auxiliary filtering agents, in particular kieselguhr and/or perlite. In contrast to conventional filter beds, this fibrous material structure consists of polyethylene and/or polypropylene fibrid particles 12. Fibrid particles of this type are formed by grinding in a shredding manner, polyethylene fibres and/or polypropylene fibres of which the initial length is approximately 0.8 to 1.2 mm. As FIG. 3 shows, these fibrid particles 12 consist of a mixture of fibre particles of different degrees of fibrillation. Thus a fibrid particle is a fibre particle 12a which has started to fibrillate to a greater or lesser extent and still comprises a fibre section 12d in its central area and is split up in the manner of a paintbrush at its end regions 12e. A fibrid particle 12b of a somewhat higher degree of fibrillation still has cohesion as a whole between the fibrids, wherein it is already split up to a great extent into fibrils 12f, particularly in the end regions, whilst parts which are more or less compact and cohesive are present, particularly in the central areas. In the case of a fibrid particle 12c which is broken up to an even greater degree practically only fibrils 12f still remain which, however, cohere to a greater or lesser extent. Finally a degree of fibrillation may be reached at which only fibrils 12f are still present In the case of the fibrous material structure of the filter bed illustrated in the example given a mixture of fibrid particles 12a, 12b, 12c of this type and completely separated fibrils 12f is used, wherein the amounts of fibrid particles of differing degrees of fibrillation are to be selected according to the filtrations requirement to be met with the filter bed. In any case, however, the mixture of fibrid particles 12a, 12b, 12c and fibrils 12f is to be selected in such a way that the necessary basic strength of the fibrous material structure is ensured and the filter-active kieselguhr particles and perlite particles 14 are embedded sufficiently and are reliably retained during the filtration process in order that they are not flushed out in the filtrate. The filter-active kieselguhr particles 13 and perlite particles 14 have grain sizes between approximately 5 um. and 100 um., it being possible for the average particle size to be set according to the filtration requirement to be met in each case by selecting a corresponding mixture ratio of relatively fine and relatively coarse particles (fine guhr with an average particle size of 20 to 50 um. and coarse guhr with an average particle size of between 50 and 70 um.). In the case of perlite particles the range and distribution of grain sizes may be selected and set in the same manner as in the case of kieselguhr particles.

In each case the fibre matrix has to comprise similarly fine ramifications in order firstly in the case of sheet formation to obtain good fibre-to-fibre matting, which ensures the necessary strength of the filter bed both in the dry and in the thoroughly wetted state, and secondly to embed the fine filter-active parts reliably in the matting of the ramified fibre sections.

Filter beds 11 provided for fine filtration comprise a fibrous material structure which is exclusively formed of fibrid particles 12. Filter beds 11 provided for meeting relatively coarse filtration requirements may contain in their fibrous material structure a proportion of up to 20% by weight of the fibrous material structure of longer fibre polyolefin fibres 15 and/or polyolefin fibres which have started to fibrillate in order to strengthen the sheet formation i.e. to increase the strength of the porous pulp sheet, wherein these longer fibre polyolefin fibres or polyolefin fibres which have started to fibrillate may have a fibre length of up to 5 mm.

One example for the production of filter beds 11 is as follows:

Water is fed in a pulper. Whilst a rotor produces violent turbulence in the process water, initially selected or premixed polyolefin fibrid material and subsequently auxiliary filtering agents, such as kieselguhr and/or perlite and optionally also special auxiliary filtering agents, such as activated carbon or PVPP, are added in amounts such that an aqueous suspension of 4% absolutely dry (=40 g/l) is formed. The proportion of the polyolefin fibrid material to auxiliary filtration agents may be from 40%:60% to 60%:40%, depending on the desired filtration effect or the filtration requirement to be met by the filter bed subsequently produced therefrom. The suspension, in which the water is merely the suspension carrier for the polyolefin fibrid particles and the auxiliary filtering agent, is now pumped on a continuous rotating sieve belt in order to produce a mat of the subsequent filter bed after being diluted with water to approximately 2.0% absolutely dry (=20 g/l). Whereas the process water initially flows downwards by means of gravity and subsequently under the effect of a vacuum through the sieve belt, the polyolefin fibrid particles and the auxiliary filtering agent remain in logical disorder on the sieve belt. They form the actual mat with the desired physical properties such as weight per unit area, thickness and density The mat is now delivered in the form of an endless web to a continuous dryer. Here it is dried with warm air at temperatures which are at least 10° C. below the melting temperature of the polyolefin fibrid particles in each case, in order that no agglomeration can occur and the morphological structure of the fibrid particles is retained. After the drying process and subsequent formatting the filter beds are ready for use.

The filter beds produced in this manner are preferably to be used as screen filters.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. Filter bed, suited for the solid-liquid separation of media containing ingredients which dissolve and/or react chemically with cellulose, said filter bed having a fiber material structure in which filter-active particles are embedded as auxiliary filtering agents, said filter bed (11) being built up in the form of a voluminous pulp and structured as a fleece, and having a fiber material skeleton formed entirely of polyolefin fibride particles (12) felted to one another and anchored in one another, said fibride particles (12) being present in a mixture of fiber particles of different degrees of fibrillation, from fiber particles (12a) in their incipient state of fibrillation to completely separated fibrils (12f).

2. Filter bed according to claim 1, wherein the fiber material skeleton is formed of polyethylene or polypropylene fibride particles (12), or of a mixture of polyethylene and polypropylene fibride particles (12).

3. Filter bed according to claim 1, wherein the weight percentage of polyolefin particles in relation to the total weight of the filter bed ranges between 40 and 60%.

4. Filter bed according to claim 1, wherein the polyolefin fibride particles have a fiber length from up to about 0.8 to about 1.2 mm.

5. Filter bed according to claim 1, wherein the fiber material skeleton contains, for up to 20% of its weight, longer-fibrous polyolefin fibers (15) and/or polyolefin fibers in their incipient state of fibrillation and having a fiber length of up to 5 mm.

6. Filter bed according to claim 1, wherein the auxiliary filtering agents embedded in the fiber material skeleton of polyolefin fibride particles (12) are kieselguhr particles (13) and/or perlite particles (14).

* * * * *